Figure 2:
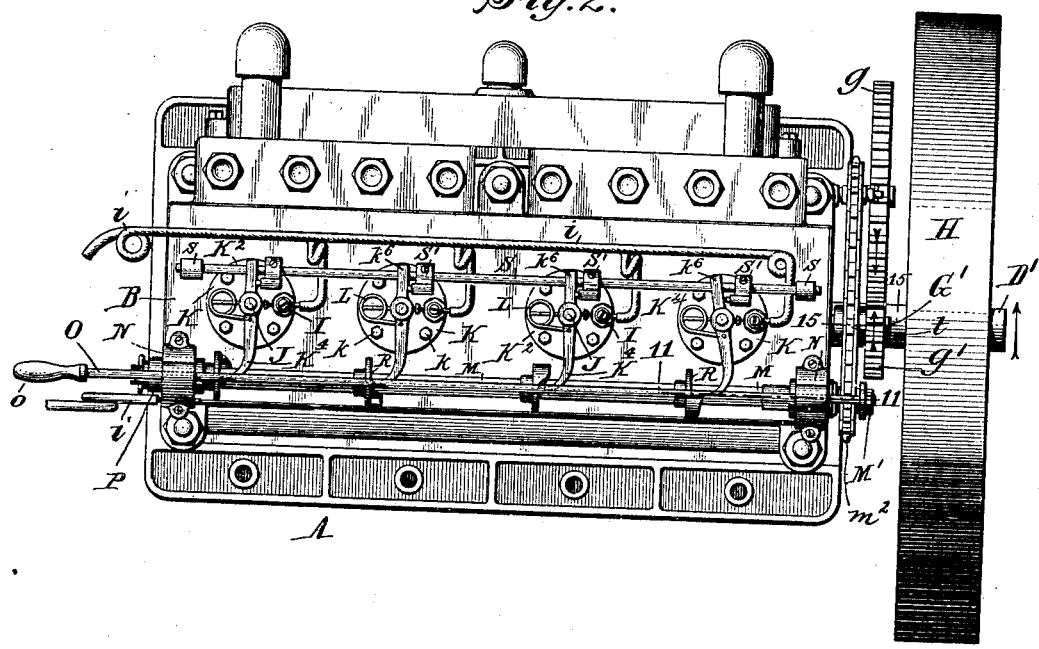

No. 719,072. PATENTED JAN. 27, 1903.
C. G. ANNESLEY.
SPARK IGNITING MECHANISM FOR EXPLOSIVE ENGINES.
APPLICATION FILED SEPT. 13, 1901.
NO MODEL. 4 SHEETS—SHEET 1.
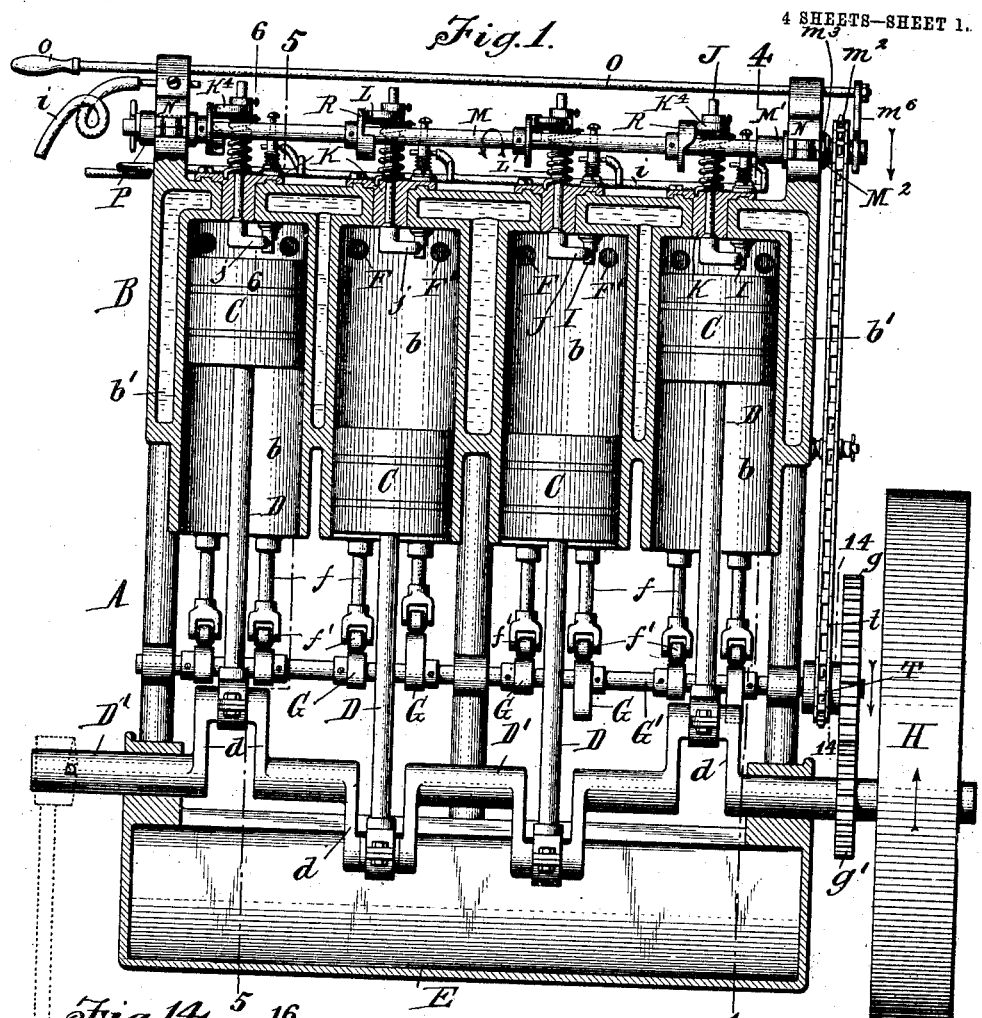
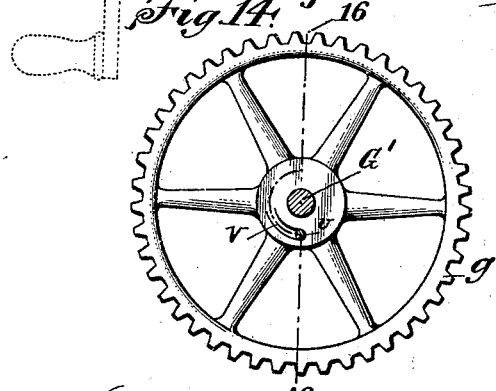
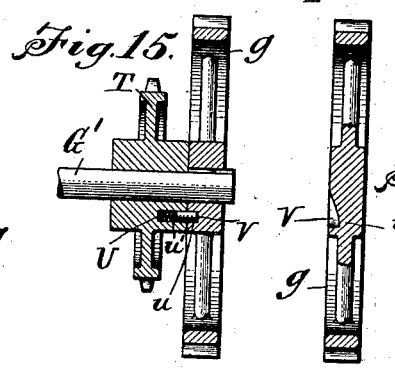
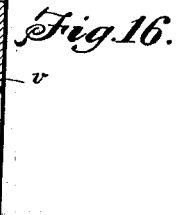
Witnesses:
Reginald P. Chamberlain
Chas. Palmer
Charles G. Annesley, Inventor.
By Newhart & Burkhart,
Attorneys.
THE NORRIS PETERS CO., PHOTO-LITHO., WASHINGTON, D. C.

No. 719,072. PATENTED JAN. 27, 1903.
C. G. ANNESLEY.
SPARK IGNITING MECHANISM FOR EXPLOSIVE ENGINES.
APPLICATION FILED SEPT. 13, 1901.
NO MODEL. 4 SHEETS—SHEET 2.

Witnesses:
Reginald P. Chamberlain
Chas. Palmer

Charles G. Annesley, Inventor.
By Neuhart & Burkhart
Attorneys

No. 719,072. PATENTED JAN. 27, 1903.
C. G. ANNESLEY.
SPARK IGNITING MECHANISM FOR EXPLOSIVE ENGINES.
APPLICATION FILED SEPT. 13, 1901.
NO MODEL. 4 SHEETS—SHEET 3.
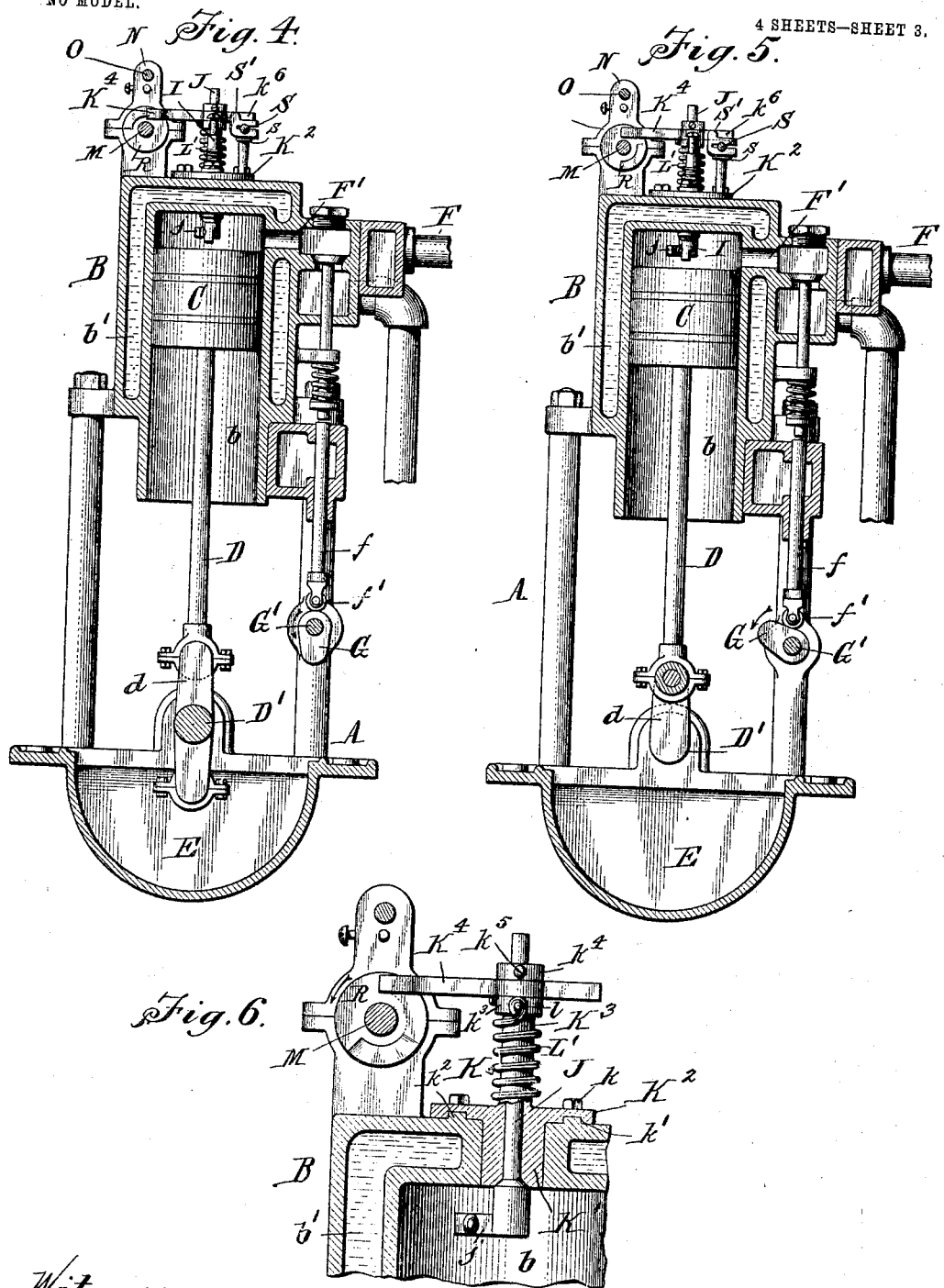

No. 719,072. PATENTED JAN. 27, 1903.
C. G. ANNESLEY.
SPARK IGNITING MECHANISM FOR EXPLOSIVE ENGINES.
APPLICATION FILED SEPT. 13, 1901.
NO MODEL.
4 SHEETS—SHEET 4.
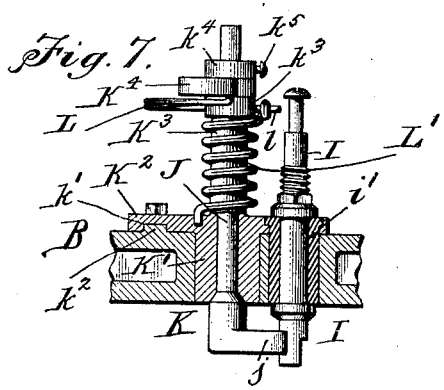
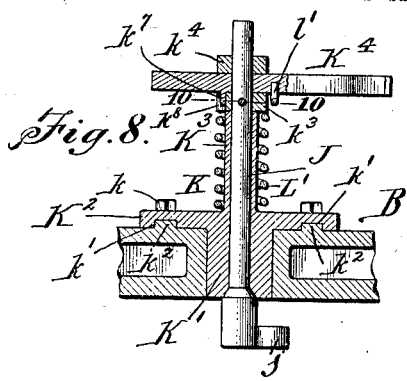
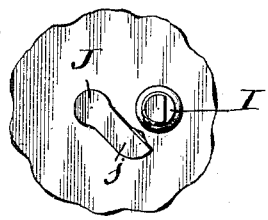
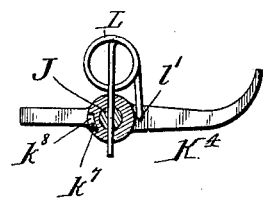
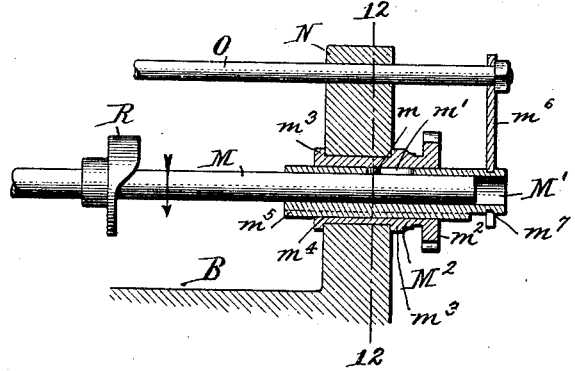
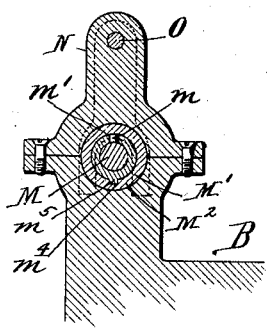
Witnesses:
Reginald P. Chamberlain.
Chas. Palmer.
Charles G. Annesley, Inventor.
By Neuhart & Burkhart
Attorneys.

UNITED STATES PATENT OFFICE.

CHARLES G. ANNESLEY, OF BUFFALO, NEW YORK, ASSIGNOR TO THE BUFFALO GASOLINE MOTOR COMPANY, OF BUFFALO, NEW YORK, A CORPORATION OF NEW YORK.

SPARK-IGNITING MECHANISM FOR EXPLOSIVE-ENGINES.

SPECIFICATION forming part of Letters Patent No. 719,072, dated January 27, 1903.

Application filed September 13, 1901. Serial No. 75,274. (No model.)

*To all whom it may concern:*

Be it known that I, CHARLES G. ANNESLEY, a subject of the King of Great Britain, residing at Buffalo, in the county of Erie and State of New York, have invented new and useful Improvements in Spark-Igniting Mechanism for Explosive-Engines, which improvements are fully set forth in the following specification and accompanying drawings.

My invention relates to explosive-engines, and more particularly to the sparking device and the speed-regulating mechanism which I have shown applied to an engine having four cylinders, each provided with a piston, electric-circuit wires being also provided and connected to the electrodes, two of which are provided for each cylinder, said electrodes being operated to produce a spark at proper intervals for igniting the compressed gas in the combustion-chamber, whereby a reciprocating motion is imparted to the pistons which are connected by piston-rods to the crank-shaft, the latter having its cranks arranged to cause the pistons to compress the gas at different points of the revolution of the crank-shaft, the igniters being operated in proper succession to cause explosion of the compressed gas in each cylinder at the proper time.

The object of this invention is to provide an engine which can be operated with greater economy and efficiency, to provide igniting means whereby a quick and positive break is caused between the electrodes to assure an effective electric spark at the proper time, and to provide effective and positive means whereby the electrodes can be made to spark at different points of the piston-stroke, which causes explosion of the gas at the highest, the lowest, or any intermediate compression, as may be desired, thereby increasing or reducing the speed of the engine, as the case may be.

With these and other objects in view the invention consists of the combination and arrangement of parts and of certain novel features of construction, as hereinafter set forth, and pointed out in the appended claims.

Figure 3:
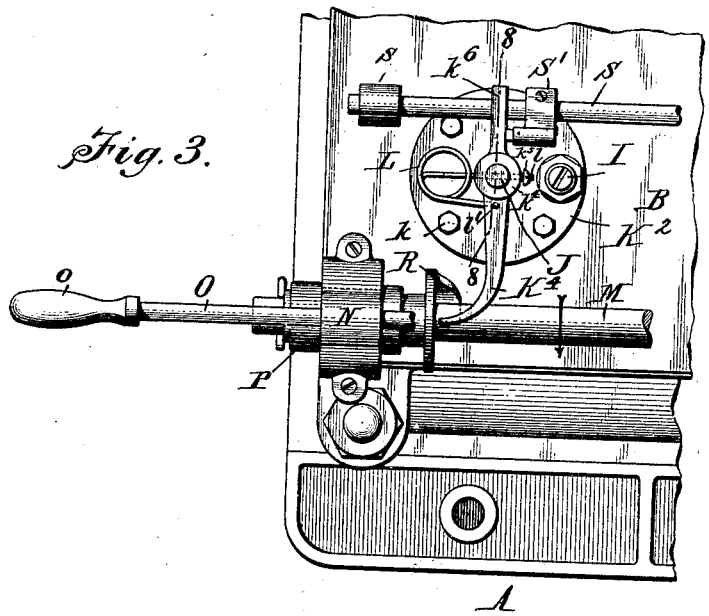

In the accompanying drawings, Figure 1 is a central vertical section of the engine. Fig. 2 is a plan view of the same. Fig. 3 is an enlarged plan view of a portion of the engine, showing the electrodes of one piston and the adjacent step-cam. Fig. 4 is a vertical section taken on or about line 4 4, Fig. 1. Fig. 5 is a similar section taken on or about line 5 5, Fig. 1. Fig. 6 is an enlarged vertical section of the upper portion of the engine, taken on line 6 6, Fig. 1. Fig. 7 is an elevation of two coacting electrodes, the engine-casing in which they are held being shown in section. Fig. 8 is a vertical section of the oscillating electrode and its attached parts, taken on line 8 8, Fig. 3. Fig. 9 is an inverted view of Fig. 7. Fig. 10 is a horizontal section taken on line 10 10, Fig. 8, looking up. Fig. 11 is a vertical section on an enlarged scale, taken on a plane indicated by line 11 11, Fig. 2. Fig. 12 is a vertical section taken on line 12 12, Fig. 11. Fig. 13 is a detached view of the cam-shaft and the adjusting-sleeve surrounding the same, the forked arm whereby the sleeve is shifted being shown in section. Fig. 14 is a vertical section taken on line 14 14, Fig. 1. Fig. 15 is an enlarged section taken on a plane indicated by line 15 15, Fig. 2. Fig. 16 is a section taken on a plane indicated by line 16 16, Fig. 14.

The novel features of this invention are shown in the drawings as embodied in or applied to a multiple-cylinder engine; but I wish to have it understood that the invention is as well adapted to a single-cylinder engine, and by describing the invention as applied to a multiple-cylinder engine I do not wish to be understood as limiting myself to such an engine, as the novel features may be applied to any of the various other forms of explosive-engines without departing from the essence of my invention.

Referring to the drawings in detail, like letters of reference refer to like parts in the several figures.

The letter A designates the framework, which may be supported on a base or secured to any other suitable support, and B the casing forming the cylinders *b*, which are surrounded by the usual water-jackets *b'*. Each cylinder is provided with a piston C, and each piston is connected by the usual piston-rod D to the cranks $d$ of a single crank-shaft D', which is journaled in the frame A in the usual manner. As is common in multiple-cylinder engines the cranks are disposed at different angles, and in this instance, where four cylinders and pistons are employed, the two inner cranks are set together or on the same angle, with the outer cranks one hundred and eighty degrees to these, the ignitions or explosions occurring in the first, second, fourth, and third cylinder successively, starting from the right, thereby giving uniform movement to the crank-shaft, produced by the equalization of power applied to the different points thereof. The bottom of the framework is provided with a trough or receptacle E, which, with a housing of any suitable form (not shown to better illustrate the working parts) secured to the framework, incloses the crank-shaft, piston-rods, and other working parts and allows the bearing parts to be oiled by splash lubrication. The requisite quantity of gas or gas-vapor supplied in any of the well-known ways is allowed to enter the combustion-chamber through the valved inlets F, and after having spent its force by ignition it is discharged through the exhaust-ports F', which are also controlled by valves, as is common. The inlet and exhaust valves are operated at the proper time by the thrust or valve rods $f$, each having a forked lower end to receive a friction-roller $f'$, which is adapted to bear against a cam G, secured to the cam-shaft G', arranged above and parallel with the crank-shaft. The cam-shaft G' has a gear-wheel $g$ secured to one of its ends, which meshes with a pinion $g'$, secured to the crank-shaft. The latter is provided with the usual fly-wheel H at one end thereof and at its other end with a crank for starting the engine.

Referring now to the sparking mechanism, I represents the fixed electrode, and J the movable electrode, both of which are secured in the upper wall of the casing and project through opposite sides of the same and each having connection with the circuit-wires $i$, which lead to a battery or any other source of electric power. The fixed electrode I may be of any common construction, and it need only be said that it passes through an insulating-sleeve $i'$, arranged in the wall of the casing, and that it projects into the combustion-chamber, any ordinary way of holding the electrode in the wall being suitable. The movable electrode J passes through a vertical bearing K, which is held in the wall of the casing, the electrode having that portion projecting inside of the casing enlarged to form a tapering shoulder, which is seated in a correspondingly-tapered seat formed on the inner side of the vertical bearing, thereby preventing lengthwise movement thereof in one direction and also preventing the leakage of gas between the bearing and the electrode. It is also provided at its lower end with a laterally-projecting contact-finger $j$, which is adapted to be moved into contact with the fixed electrode, producing the electric spark for igniting the gas in the combustion-chamber the instant they are separated. The vertical bearing K consists of the bearing-sleeve K', having a peripheral flange $K^2$ at its upper end, through which the securing-nuts $k$ pass to securely hold the bearing in the casing. Projecting upwardly from the outer face of the bearing-flange is a sleeve $K^3$. The under side of the bearing-flange $K^2$ is provided with a circular groove $k'$, arranged concentric with the bearing-sleeve K', and in this groove a corresponding rib $k^2$ is fitted, which is formed on the casing. Both the rib and the groove are ground to form a tight joint, which prevents the escape of gas from the combustion-chamber. Carried on the electrode and bearing against the upper end of the sleeve $K^3$ is a collar $k^3$, between which and a collar $k^4$, secured by means of set-screws $k^5$ to the electrode, an operating-lever $K^4$ is located. Lengthwise movement of the electrode is thus prevented in the opposite direction. Each operating-lever is provided with a rearward extension $k^6$, for a purpose hereinafter described, and a downwardly-projecting pin $k^7$, which engages a vertical groove $k^8$, formed in the collar $k^3$, the sides of the groove acting as stops to limit the movement thereof. One end of a "trigger-spring" L passes through the electrode J and the collar $k^3$ and projects through the latter, as at $l$, it being coiled midway between its ends, and has its other end secured to the lever $K^4$, as at $l'$. To the projecting end of the trigger-spring L one end of a spiral spring L' is secured, which surrounds the sleeve $K^3$, and is secured with its other end to the bearing K. The construction of the movable electrode and its attached parts assures a quick and positive break of the electric circuit and produces an instantaneous and effective spark. When the operating-lever is moved by the step or incline on its coacting cam, as will be described hereinafter, the movable electrode is forced against the fixed electrode and the spiral spring L' is placed under full tension. The trigger-spring, being formed of stiff wire, is next placed under tension by the further movement of the operating-lever; but during this further movement the latter simply turns on the electrode J and its downwardly-projecting pin $k^7$ rides in the groove $k^8$, formed in the collar $k^3$, the said downwardly-projecting pin approaching the end of its limited movement when the operating-lever $K^4$ is released by the abrupt rear face of the inclined step on the cam riding under the same. This releases the trigger-spring and allows the downwardly-projecting pin $k^7$ to return to its normal position in the groove $k^8$, after which the spiral spring is released, whereby the movable electrode is disengaged from the fixed electrode. The construction of the igniter permits the spiral spring to be brought under full tension, which when released, causes the movable electrode to be disengaged from the fixed electrode with great rapidity, thereby assuring an effective spark. The trigger-spring is mainly for the purpose of yieldingly holding the operating-lever of the movable electrode against the cam; but it also assists the spiral spring in separating the two electrodes.

M designates the igniter cam-shaft fitted with a pin $m$, which engages a diagonal or oblique slot $m'$, formed in the slidable adjusting-sleeve M', which surrounds the said shaft. Surrounding the sleeve M' is a sleeve M², which has a sprocket-wheel $m^2$ formed thereon or secured thereto and two circumferential flanges $m^3$, which bear against opposite sides of the bearing N, formed on the engine-casing, thus preventing lengthwise movement of the outer sleeve M². To allow the inner or adjusting sleeve to slide within the outer sleeve and to compel it to turn with the same, I provide a longitudinal groove $m^4$ in the outer sleeve, and therein a corresponding rib $m^5$ is seated, said rib being formed on the periphery of the inner or adjusting sleeve. The latter is shifted by a forked arm $m^6$, which engages a circumferential groove $m^7$, formed in said sleeve. The upper end of said arm is secured to a shifting rod O, held in the upper ends of the bearings N, a handle $o$ being provided at one end thereof to operate the same. The opposite end of the igniter cam-shaft revolves in a flanged bearing-sleeve P, held in one of the bearings N. Secured to said cam-shaft at points in operative relation to the operating-levers of the movable electrodes are step-cams R, which on being revolved engage the ends of the said levers and actuate the electrodes.

S designates a rod which is rigidly secured in supports $s$, arranged on the upper side of the casing. Adjustably secured to this rod are stops S', having a rubber, felt, or other similar facing, against which the rearward extensions $k^6$, formed on each operating-lever K⁴, bear to limit the inward movement of the same. As the cam passes under the front end of its coacting operating-lever the springs L L' force the same inwardly toward the body of the cam and the rearward extension thereof against the adjacent stop S', which prevents the lever from striking the body portion of the cam, thereby avoiding the wearing of the parts as well as the noise and snapping of the lever against the cam.

A sprocket-wheel T is mounted loosely on the cam-shaft G', around which and the sprocket-wheel $m^2$, secured to the igniter cam-shaft, a sprocket-chain $t$ passes to revolve the latter.

A socket U is formed in the hub of the sprocket-wheel T, and therein a clutch-pin $u$ is located. A spring $u'$, bearing with one end against the inner end of the socket and with its other end against the inner end of the pin, tends to keep the latter projected. The outer end of this clutch-pin engages a curved groove V, formed in the contiguous face of the gear-wheel $g$. This groove is arranged concentric with the cam-shaft G' and is inclined from the face of the gear-wheel inwardly to form a shoulder $v$ at one end, against which the clutch-pin $u$ bears when the crank-shaft is revolved, thereby revolving the sprocket-wheel T in a like direction, which imparts motion to the igniter cam-shaft through the medium of the sprocket-chain $t$, sprocket-wheel $m^2$, and sleeve M². If for any reason the crank-shaft is reversed, the clutch-pin $u$ is forced inwardly against the pressure of the spring $u'$ by the inclined rear face of the curved groove V, formed in the gear-wheel $g$, which latter when revolved causes the said pin to bear against its contiguous face until the shouldered end of the groove V is brought in line with the clutch-pin. The spring $u'$ will force the same into the curved groove, the inclined rear face of which will force the clutch-pin inwardly, this being continued as long as the crank-shaft is reversed. The purpose of this clutch is to prevent the reversing of the igniter cam-shaft, which would cause the rear or abrupt face of the cam to strike against the outer end of the operating-lever held on the movable electrode and cause the same to be broken or displaced.

The operation of the mechanism is as follows: The gas is supplied to the combustion-chamber, ignited by the electric spark, and exhausted in any manner common to explosive-engines. As shown in the drawings, the cam-shaft G' and the igniter cam-shaft are revolved at one-half the speed of the crank-shaft, thereby causing the latter to make two revolutions before the gas is ignited in the same combustion-chamber a second time. The step-cams are secured to the igniter cam-shaft and engage the operating-levers of the movable electrodes at a predetermined moment, fixed to the position the pistons assume in the cylinders. Assuming the shifting rod O to be at the extreme left of its movement, as shown in Figs. 1 and 2, the steps or inclines on the cams engage the operating-levers of their movable coacting electrodes and ride over the abrupt rear face of the same to form a spark when the respective pistons in the cylinders to which the electrodes are secured are at their highest point, or, in other words, when the gas is compressed to its fullest extent, thus causing the engine to revolve at a high speed. On shifting the lever O to the extreme right of its movement, as shown in Figs. 11 and 13, the forked arm $m^6$ slides the adjusting-sleeve M² outwardly or to the right, which through the medium of the slot $m'$ and and pin $m$ turns the shaft in a direction opposite to the direction in which it revolves, whereby the cams secured thereon are caused to engage and operate the movable electrodes and cause an electric spark when the respective pistons in the cylinders to which the sparking electrodes are secured are at a point considerably below its innermost or highest point, or, in other words, when the gas is at a low compression. This is of particular advantage in starting the engine and also when used on a motor vehicle or boat—as, for instance, in approaching a stopping-place. By moving the shifting lever to a point intermediate of these points the cams are given a proportional "lead" and the gases ignited when compressed accordingly, thus causing the engine to increase its speed.

Having thus described my invention, what I claim is—

1. In an explosive-engine, the combination of a sparking device, a shaft having a cam adapted to actuate said sparking device, an outer sleeve adapted to be rotated directly by the engine, an interior adjusting-sleeve to which the outer sleeve is splined, said adjusting-sleeve turning with and adapted to be shifted in the outer sleeve, and a pin projecting from the shaft and adapted to enter an inclined slot in the walls of the interior sleeve, all arranged so that when the adjusting-sleeve is shifted in the outer sleeve, the shaft and cam secured thereto may be turned with respect to the adjusting and outer sleeves, whereby the relative position of the cam with respect to its coacting part for actuating the sparking device may be varied, substantially as and for the purpose set forth.

2. An electric igniting device for gas-engines, consisting of a fixed electrode, and an oscillating or movable electrode comprising a shaft with a contact-finger designed to engage the fixed electrode, a collar secured on said shaft and having stops thereon, an operating-lever held loosely on said shaft and having a pin projecting therefrom which travels between said stops, a spring coiled between its ends and having one end passing through the said shaft and collar so as to project from the latter, and its other end secured to the operating-lever, and a spiral spring surrounding the shaft and being secured at one end to the projecting end of the other spring and at its other end to a fixed or immovable point, substantially as set forth.

3. An electric igniting device for gas-engines, comprising a fixed electrode, and a movable or oscillating electrode having a center shaft with a contact-finger designed to engage the fixed electrode, a stationary or fixed sleeve surrounding said movable electrode, a collar secured on said center shaft and having a longitudinal groove formed in its periphery, an operating-lever held loosely on said shaft above said collar and having a downwardly-projecting pin which engages the said groove, a spring coiled between its ends and having one end thereof passing through said shaft and collar so as to project from the latter, and its other end secured to the operating-lever, and a spiral spring surrounding the said sleeve and being secured at one end to the projecting end of the other spring and at its other end to a fixed or immovable point, substantially as set forth.

4. In a gas-engine, the combination with the igniter cam-shaft having a cam thereon, of two electrodes arranged to contact, one of said electrodes comprising a center shaft with a contact-finger, a stationary sleeve surrounding said center shaft, a collar held on the latter and having a longitudinal groove formed on its periphery, an operating-lever held loosely on said shaft above said collar and having a downwardly-projecting pin which engages the said groove, said operating-lever being adapted for engagement with the cam on the said cam-shaft, a spring coiled between its ends and having one end thereof passing through the said shaft and collar so as to project from the latter, and its other end secured to said operating-lever, and a spiral spring surrounding said sleeve and being secured with one end to the projecting end of the other spring and with its other end to a fixed or immovable point, substantially as set forth.

5. An oscillating electrode for electrical gas-igniters, comprising a shaft having a lateral contact-finger and being supported against lengthwise movements, a collar held on the shaft and having a longitudinal groove formed on its periphery, an operating-lever held loosely on the shaft above said collar and having a projecting pin adapted for engagement with said groove, a spring coiled between its ends and having one end passing through the said shaft and collar so as to project from the latter, and its other end secured to the operating-lever, and a spiral spring secured with one end to the projecting end of the other spring and with its other end to a fixed or immovable point, substantially as set forth.

In testimony that I claim the foregoing as my own I have hereto affixed my signature in presence of two subscribing witnesses.

CHAS. G. ANNESLEY.

Witnesses:
A. SNYDER,
CHAS. F. BURKHART.